(12) United States Patent
Edgren

(10) Patent No.: US 6,186,540 B1
(45) Date of Patent: Feb. 13, 2001

(54) METHOD OF FILLING AN EMPTY, FLEXIBLE CONTAINER, AND A CONTAINER DEVICE

(75) Inventor: Hans Edgren, Lidingö (SE)

(73) Assignee: AGA Aktiebolag, Lidingo (SE)

( * ) Notice: Under 35 U.S.C. 154(b), the term of this patent shall be extended for 0 days.

(21) Appl. No.: 09/319,847

(22) PCT Filed: Dec. 9, 1997

(86) PCT No.: PCT/SE97/02055
§ 371 Date: Jun. 11, 1999
§ 102(e) Date: Jun. 11, 1999

(87) PCT Pub. No.: WO98/26960
PCT Pub. Date: Jun. 25, 1998

(30) Foreign Application Priority Data

Dec. 17, 1996 (SE) .................................................. 9604637

(51) Int. Cl.⁷ .................................................. B60R 21/32
(52) U.S. Cl. ........................ 280/735; 280/740; 280/743.2
(58) Field of Search .................................. 280/740, 741, 280/742, 735, 736, 739, 734, 743.1, 743.2

(56) References Cited

U.S. PATENT DOCUMENTS

| | | | |
|---|---|---|---|
| 5,184,845 | * 2/1993 | Omura | 280/735 |
| 5,348,344 | * 9/1994 | Blumenthal et al. | 280/737 |
| 5,513,879 | * 5/1996 | Patel et al. | 280/739 |
| 5,820,161 | * 10/1998 | Svensson | 280/737 |
| 5,957,490 | * 9/1999 | Sinnhuber | 280/735 |

FOREIGN PATENT DOCUMENTS

| | | |
|---|---|---|
| 40 41 049 A1 | 7/1992 | (DE) . |
| 195 26 334 A1 | 1/1997 | (DE) . |
| 0 357 225 A1 | 3/1990 | (EP) . |
| 0 405 710 A1 | 1/1991 | (EP) . |
| 0 656 283 A1 | 6/1995 | (EP) . |
| 2 306 409 | 5/1997 | (GB) . |

* cited by examiner

Primary Examiner—Paul N. Dickson
Assistant Examiner—Faye M. Fleming
(74) Attorney, Agent, or Firm—Pearne & Gordon. LLP

(57) ABSTRACT

The present invention relates to apparatus for filling an empty, flexible container (8) with gas essentially instantaneously when subjected to powerful retardation forces, wherein the gas-filled container (8) functions as a force-absorbing cushion which protects against injuries, wherein the apparatus includes pressure receptacles (1, 2) which is filled with gas under high pressure, a conduit (5) which connects the receptacles (1, 2) with the container (8), means for opening the connection between the receptacles (1, 2) and the flexible container (8) when subjected to retardation forces that exceed a smallest value, a container-holding device (7), and a retardation meter. The vessel is comprised of two pressure receptacles (1, 2) which are each sealed by means of a closure means and each of which has a respective connection conduit (3 and 4) which joins pressure receptacles (1, 2) to the flexible container (8). One pressure receptacle (1) contains oxygen and an inert gas while the other receptacle (2) contains inert gas and hydrogen, wherein the inert gas is helium, argon and/or nitrogen.

18 Claims, 2 Drawing Sheets

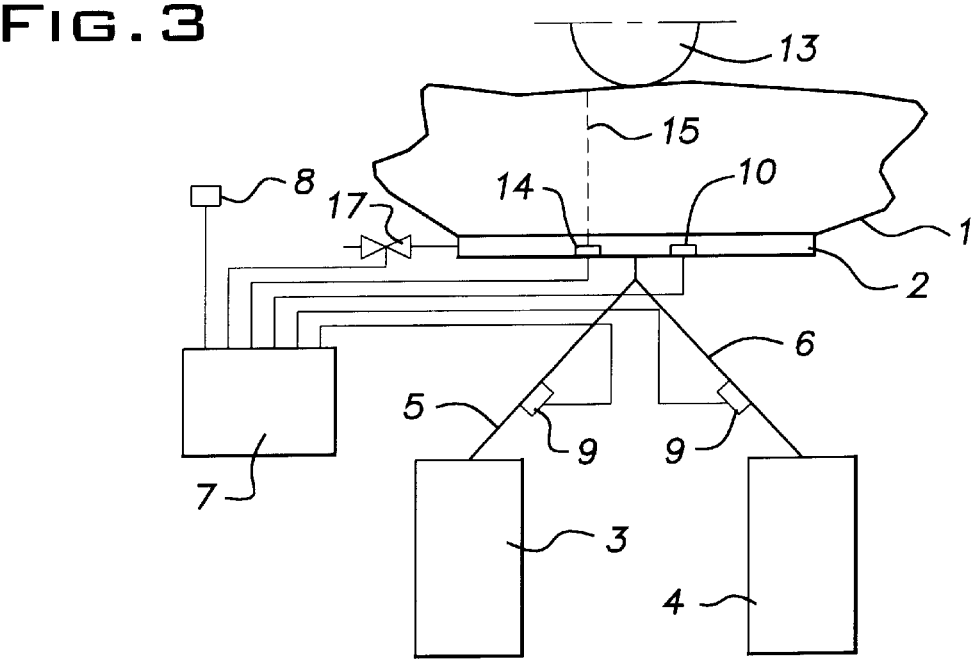
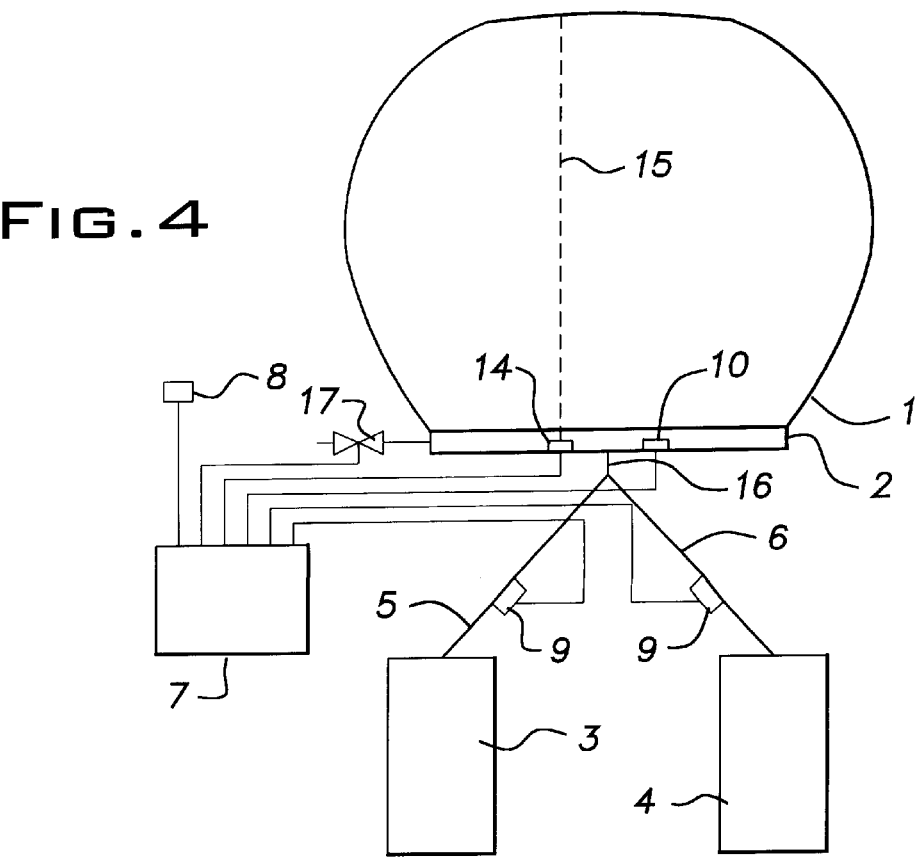

METHOD OF FILLING AN EMPTY, FLEXIBLE CONTAINER, AND A CONTAINER DEVICE

THE TECHNICAL FIELD OF THE INVENTION AND PRIOR ART

The present invention refers to a method of filling an empty, flexible container to be provided in a vehicle with a gas when the container is subjected to a powerful retardation, wherein the gas-filled container functions as a force absorbing cushion which protects against injuries. Furthermore, the present invention refers to a container device for a vehicle, comprising a flexible container provided to be filled with gas when the container device is subjected to a powerful retardation and thereby to function as a force absorbing cushion which protects against injuries.

It is known to provide an apparatus for inflating an empty flexible container, such as an air bag, incorporated in the passenger compartment of an automotive vehicle as an alternative or preferably as a supplement to safety belts. In the event of collision, resulting in the application of significant retardation or deceleration forces to the vehicle and the apparatus, the air bags are inflated immediately, or extremely quickly in front of the driver or passengers in order to protect the driver or passengers from injuries that they otherwise might suffer if thrown against the steering wheel or the instrument panel of the vehicle.

However, it has been recognized that such airbags also may lead to injuries in cases when the driver or a passenger is in a position too close to the airbag prior to its inflating. The forces by which the airbag during the inflating in such cases hits the driver or passenger might be powerful enough to seriously injure or even kill the driver or the passenger. Moreover, if a seat for a child is position close to such an airbag prior to its inflating, the forces by which the airbag during the inflating hits said seat might be powerful enough to seriously injure a child seated in said seat.

DE-A-2 501 602 discloses such an previously known airbag device for an automotive vehicle. The device comprises a first receptacle which is filled with pressurized gas to be expanded for filling the airbag upon retardation, and an ignition chamber comprising a medium to be combusted for raising the temperature of the expanding gas during the filling of the airbag. During said combustion carbon monoxide is formed. Said gas contains an inert gas, such as argon, helium or neon, and a small amount of oxygen in order to enable the conversion of said carbon monoxide to carbon dioxide.

U.S. Pat. No. 5,348,344 discloses another previously known airbag device comprising two gas receptacles and a combustion chamber provided upstream of an inflatable, flexible container and having ignition means for initiating the combustion of the gases from the receptacles in the combustion chamber. The combustion chamber is generally separated from the flexible container by means of an end wall in the form of a burst disk which bursts when the pressure in the combustion chamber reaches a predetermined level.

DE-A-2 344 517 discloses still another, previously known airbag for a vehicle, which is provided to be inflated less quickly in case of a collision at a relatively low speed and more quickly in case of a collision at a relatively high speed. To this end the known airbag comprises two different propellants, one for each inflating situation.

SUMMARY OF THE INVENTION

The object of the present invention is to improve the security of an airbag for the driver and the passengers in case of a collision, and to prevent injuries due the airbag filling process.

This object is obtained by the method initially defined and comprising the following steps of operation: partly filling the container during a first filling step, sensing a value of a parameter reflecting the size of the container, and continuing filling of the container during a second filling step if said value fulfils a predetermined condition. By such a method it is possible to detect if an object or a person is positioned in an inflating direction of the airbag and to reduce the filling degree of the airbag in case of such a detection. Consequently, by the method according to the invention it is possible to prevent injuries due to the circumstances that the airbag during the filling process hits such an object or person. As a consequence, said second filling step is not performed if said value does not fulfil said predetermined value. Alternatively, said second filling step may include discharge of gas from the container if said value does not fulfil said predetermined condition.

According to one embodiment of the invention, said parameter includes the length of the container along one direction and said filling step is performed if said length exceeds a predetermined level after the first filling step. Thus, it is possible to fully inflate the airbag under the condition that the airbag may expand freely in said direction, i.e. that no object or person is hindering the fully expansion of the airbag. Thereby, said one direction is substantially opposite to the travel direction of said vehicle.

According to another embodiment of the invention, said parameter includes the pressure within the container and said second filling step is performed if said pressure is below a predetermined pressure level after the first filling step. If the expansion of the airbag is hindered by an object or a person it is possible to detect a higher pressure within the container than if the container is expanded to its full size during the first filling step.

According to a further embodiment of the invention, said first filling step comprises partly filling the container by the supply of at least one gas. In this case, the second filling step may comprise for example continuing filling of the container with a further gas, the ignition of a propellant or a combination thereof.

According to a further embodiment of the invention, said first filling step comprises partly filling the container by the supply of at least two gases and a second filling step comprises filling the container by igniting the two gases. Thereby the two gases may be mixed together within the container during the first filling step. Furthermore, said two gases may comprise at least oxygen and hydrogen. The ignition of a mixture of oxygen and hydrogen results in a powerful immediate expansion of the container during the second filling step. Furthermore, said two gases may comprise an inert component including at least one of argon, helium and nitrogen.

The object stated above is also obtained by the container device initially defined and characterized by first filling means for partly filling the container during the first filling step, means for sensing a parameter reflecting the size of the container, and second filling means for continuing filling of the container during the second filling step if said parameter fulfils a predetermined condition. Such a device enables the protection of an object or a person hindering the full expansion of an airbag. Moreover, said device enables to partly fill the airbag to prevent high forces from hitting said object or persons.

Preferred embodiments of the container device are defined in the dependent claims 10–17.

BRIEF DESCRIPTION OF THE DRAWINGS

The present invention will now be described more closely with reference to different embodiments disclosed in the acccompanying drawings.

FIG. 3 discloses a container device according to a second embodiment of the invention in a first situation.

FIG. 4 discloses the container device in FIG. 3 in a second situation.

BRIEF DESCRIPTION OF DIFFERENT EMBODIMENTS

Figure 1:
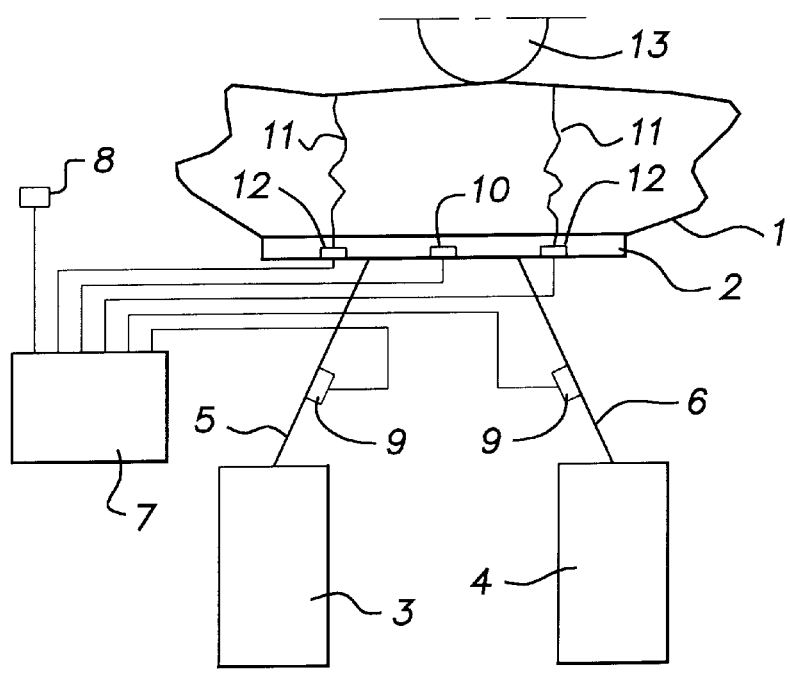
FIG. 1 discloses a container device according to a first embodiment of the invention in a first situation.
Figure 2:
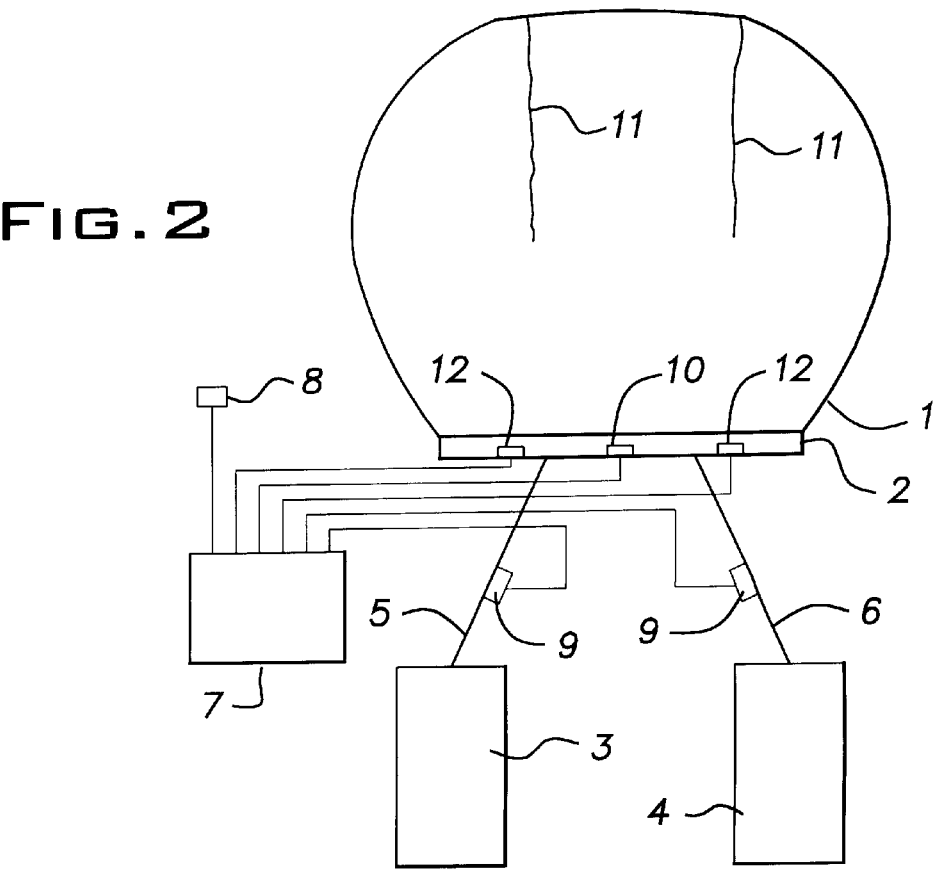
FIG. 2 discloses the container device in FIG. 1 in a second situation.

With reference to FIGS. 1 and 2 there is disclosed a container device according to a first embodiment. The container device comprises a flexible container 1, in the following called the airbag 1. The airbag 1 is mounted to a base member 2 which in turn is attachable to the steering wheel, the front instrument panel or the rear surface of the front chairs in an automotive vehicle. The base member 2 is shaped as a box housing the airbag 1 in its inactive position. The airbag 1 has an opening which is sealingly joined to the base member 2. The base member 2 and thus the interior of the airbag 1 is connected to a first receptacle 3 and a second receptacle 4 via conduit members 5 and 6, respectively. The first receptacle 3 contains a gas mixture under high pressure of oxygen and at least one of argon, helium and nitrogen. The amount of oxygen present in the receptacle 3 corresponds to between 2.5 and 20% by volume of the total volume of gas in the two receptacles 3 and 4. The second receptacle 4 contains a gas mixture of hydrogen and a inert gas such as at least one of argon, helium and nitrogen. The amount of hydrogen present in the second receptacle 4 corresponds to between 3 and 15% by volume of the total gas volume in the two receptacles 3 and 4. Preferably, the receptacles 3 and 4 contain the same inert gas. In the embodiment disclosed helium is the most preferred inert gas.

Furthermore, the container device comprises a control device 7 and a retardation meter 8 connected to the control device 7 and arranged to sense the deceleration of the vehicle. The control device 7 is electrically connected to burst plates 9 provided on the conduits 5 and 6, respectively. At the bottom of the base member 2 within the airbag 1 there is mounted an ignition device 10 electrically connected to the control device 7. It should be noted that the ignition device 10 may be of any known type, e.g. an electrical spark plug, a charge to be mechanically activated et cetera.

Furthermore, the container device comprises a sensing means for sensing a parameter reflecting the size of the airbag 1. In the first embodiment the sensing means comprises two flexible wires 11, each of which is fixed to the inner wall of the airbag 1 at one end and attached to a respective actuator 12 at the other end. The actuators 12 are mounted to the base member 2 and electrically connected to the control device 7. Each actuator 12 is provided to be activated, i.e. to produce an electrical signal or impulse, when the wire 11 is extended and pulled off the activator 12.

FIG. 1 discloses a hinder 13 which may be for example an object such as a seat for a child, or a person positioned relatively close to the steering wheel, the instrument panel or the front chair.

In the case that the retardation meter 8 senses a sufficient retardation or deceleration force indicating a vehicle collision, a signal is produced and transferred via the control device 7, which may form a part of the retardation meter 8, to the burst plates 9, which then are activated, i.e. ruptured or burst. Thereby, the conduits 5 and 6 are open and the gas mixtures of the receptacles 3 and 4 are rapidly supplied to the interior of the airbag 1. Consequently, the airbag 1 is filled with gas and thus expanded. As disclosed in FIG. 1, the expansion of the airbag 1 is hindered by the object 13. This means that the wires 11 are not extended to their full length, and consequently the activators 12 are not activated. Because of this, no signal or impulse is sent to the ignition device 10, and therefore no further expansion of the airbag 1 will be performed. Turning now to FIG. 2 and the situation in which there is no object or person hindering the expansion of the airbag 1. This means that the wires 11 will be extended and pulled off the activators 12. Therefore, a signal or impulse will be sent from each of the activators 12 to the control device 7 which in turn then activates the ignition device 10 to ignite the gas mixture within the airbag 1. Thus, activation of the ignition device 10 results in a rapid combustion between hydrogen and oxygen raising the temperature of the gas mixture in the airbag 1 and thereby producing an expansion sufficient for fully expanding the airbag 1 to its final size. It should be noted that the present invention also may be performed by merely one wire 11 and one actuator 12. In the case of two wires 11 and two actuators 12, it is possible to arrange the actuators 12 such that the control device 7 produces an ignition signal only then when both the wires 11 has been extended and pulled of the respective actuator 12. Of course it is also possible to provide more than two wires 11 and actuators 12.

FIGS. 3 and 4 disclose a second embodiment of the invention. It should be noted that components having a corresponding function has been provided with the same reference signs in all embodiments disclosed. The second embodiment differs from the first one in that the flexible wires 11 and the actuators 12 have been replaced by a distance measuring device 14. The distance measuring device 14 is of a known type, for instance a laser emitting device, an IR-sensor et cetera. The distance measuring device 14 measures the distance from the base member 2 to the opposing inner wall of the airbag 1 as indicating by the dotted line 15. Moreover, in the second embodiment, the conduits 5 and 6 are joined to each other and form a common conduit inlet channel 16 to the interior of the airbag 1.

Upon detection of a strong, powerful retardation a signal or impulse is sent to the burst plates 9 initiating a first filling step by supplying the gas mixtures of the receptacles 3 and 4 to the interior of the airbag 1. If the expansion of the airbag 1 is hindered by an object or a person 13 the distance 15 sensed by the distance measuring device 14 will not be sufficient for activating the ignition device 10 and thus the airbag 1 will not be completely filled. If no object or person hinders the expansion of the airbag 1 the distance 15 will exceed a predetermined level and the distance measuring device 14 will give rise to a signal or impulse to the ignition device 10 resulting in the ignition of the gas mixture within the airbag 1 in the same manner as in the first embodiment.

According to a third embodiment the wires 11 and the actuators 12, and the distance measuring device 14 are replaced by a pressure sensor provided within the container 1. The third embodiment may also be illustrated by FIGS. 3 and 4, wherein reference sign 14 denotes the pressure sensor. If an object or a person 13 hinders the expansion of the airbag 1 the pressure within the airbag 1 will be higher than if the airbag 1 would have been allowed to expand to its full size during the first filling step. Thus, if the pressure level sensed by the sensor 14 is above a predetermined level no signal will be produced to the ignition device 10 and if the pressure level sensed by the sensor 14 is below said predetermined level a signal will be sent to the ignition device which then ignites the gas mixture within the airbag 1.

FIGS. 3 and 4 may also illustrate a fourth embodiment of the invention. The base member 2 may comprise discharge valve 17 connected to the control unit 7 and arranged to open during the second filling step if there is a hinder 13 detected during the first filling step. Thus, it is possible to prevent full expansion of the airbag 1 by opening the valve 17.

The present invention is not limited to the embodiments disclosed but may be varied and modified within the scope of the appendant claims.

For instance, it is possible to provide the distance measuring device 14 outside the airbag 1, wherein the distance measuring device e.g. may be in the form of a light emitting device and a photocell for the determination of the position of the outermost part of the airbag 1.

The airbag 1 may also be filled by other means than those described above. For instance, the first filling step may be performed by the supply of a first gas or gas mixture and the second filling step may be performed by the supply of a second gas or gas mixture. In this case no ignition takes place. Furthermore, one or both of the filling steps may be performed by pyrotechnical means, i.e. ignition of a first and second propellant. It is also possible to fill the airbag 1 by a combination of these techniques, i.e. filling the container 1 with a gas or gas mixture during the first filling step and igniting a propellant during the second filling step.

The invention is not limited to two filling steps, but each of the first and second filling step may include one or several filling steps.

What is claimed is:

1. A method of filling an empty, flexible container to be provided in a vehicle with a gas when the container is subjected to a powerful retardation, wherein the gas-filled container functions as a force absorbing cushion which protects against injuries, said method comprising the following steps of operation:

partly filling the container during a first filling step, sensing a value of a parameter reflecting the size of the container as a result of an object or a person being positioned in the expansion zone of the container, and continuing filling of the container during a second filling step if said value indicates that no object or person is positioned within the expansion zone of the container and not performing said second filling step if said value indicates that an object or person is positioned within the expansion zone of the container.

2. A method according to claim 1, wherein said parameter includes a length of the container along one direction and that said second filling step is performed if said length exceeds a predetermined level after the first filling step.

3. A method according to claim 2, wherein said one direction is substantially opposite to a travel direction of said vehicle.

4. A method according to claim 1, wherein said parameter includes a pressure within the container and that said second filling step is performed if said pressure is below a predetermined pressure level after the first filling step.

5. A method according to any one of the preceding claims, wherein said first filling step comprises partly filling the container by supplying at least one gas to said container.

6. A method according to any of claims 1–4, wherein said first filling step comprises partly filling the container by supplying at least two gases to said container and the second filling step comprises filling the container by igniting said at least two gases.

7. A method according to claim 6, wherein said at least two gases include oxygen and hydrogen.

8. A method according to claim 6, wherein said at least two gases comprise an inert component including at least one of argon, helium and nitrogen.

9. A method according to claim 7, wherein said at least two gases comprise an inert component including at least one of argon, helium and nitrogen.

10. A container device for a vehicle, comprising a flexible container (1) provided to be filled with gas when the container device is subjected to a powerful retardation and thereby to function as a force absorbing cushion which protects against injuries, said container device comprising:

first filling means (3, 4) for partly filling the container during a first filling step, means (11, 12, 14) for sensing a parameter reflecting a size of the container (1) as a result of an object or person being positioned within an expansion zone of the container, and control means for activating a second filling means (10) for continuing filling of the container (1) during a second filling step if said parameter indicates that no object or person is positioned within the expansion zone of the container (1) and for not initiating the second filling step if said parameter indicates that the object or person is positioned within the expansion zone of the container (1).

11. A device according to claim 10, wherein said sensing means (11, 12, 14) is adapted to detect a length of the container (1) along one direction.

12. A device according to claim 11, wherein said sensing means comprises control means (7,10) arranged to initiate said second filling step if the detected length exceeds a predetermined level after the first filling step.

13. A device according to claim 12, wherein said sensing means comprises a distance measuring device (14) provided to detect a substantially outermost position of the container (1) along said one direction.

14. A device according to claim 13, wherein said sensing means comprises at least one flexible wire (11) mounted in the container (1) and having a length substantially corresponding to said predetermined length.

15. A device according to claim 14, wherein the flexible container (1) is supported by a base member (2), said control means comprises an actuating device (12) mounted to the base member (2), and said at least one flexible wire (12) is attached to an inner wall of the container (1) and to the actuating device (12), said actuating device (12) being arranged to initiate said second filling step if said at least one flexible wire (11) is extended to its full length during the first filling step.

16. A device according to claim 11, wherein said sensing means comprises a pressure sensor (14) for sensing pressure within the container (1) and control means (7, 10) arranged to initiate said second filling step if the pressure sensed by said sensor (14) after the first filling step is below a predetermined pressure level.

17. A device according to any one of claims 11–16, wherein said first filling means comprises a first pressure receptacle (3) which is filled with a first gas mixture under high pressure, a second pressure receptacle (4) which is filled with second gas mixture under high pressure, and conduit means (5, 6, 16) connecting the first and second receptacles (3, 4) to an interior of the flexible container.

18. A device according to claim 17, wherein said second filling means comprises ignition means (10) provided in the flexible container (1) to ignite a mixture of the first gas mixture and the second gas mixture within the flexible container (1).

* * * * *